Patented Sept. 5, 1933

1,925,321

UNITED STATES PATENT OFFICE 1,925,321

METHOD OF MAKING PHENOL

William J. Hale and Edgar C. Britton, Midland, Mich., assignors to The Dow Chemical Company, Midland, Mich., a corporation of Michigan No Drawing. Application January 26, 1931
Serial No. 511,438

11 Claims. (Cl. 260—154)

In U. S. Patent 1,607,618 issued to us under date of November 23, 1926, we disclose and claim broadly the step which consists in adding diphenyl oxide to the reaction mixture in a process for the manufacture of a phenolic compound by hydrolizing a halogenated benzene hydrocarbon with an aqueous solution of an alkali metal hydroxide, wherein the corresponding phenate, instead of phenol itself, is the immediate product of the reaction.

We have now discovered that the step of thus adding diphenyl oxide to the reaction mixture has similar highly important and useful results in a method of making free phenol directly without acidification of the reaction product by subjecting to heat and pressure an aqueous solution of a benzene halide and a salt of a strong base and weak acid. In practice, as in the case of our above identified patented process, the diphenyl oxide thus added to the reaction mixture is that derived from the reaction itself, being separated from the phenol simultaneously produced. As a result of the reintroduction of the diphenyl oxide into the system, the latter is maintained in an approximate state of balance with respect to such compound and the yield of phenol is measurably increased.

To the accomplishment of the foregoing and related ends, the invention, then, consists in the steps hereinafter fully described and particularly pointed out in the claims, the following description setting forth but one of the various ways in which the invention may be used.

According to the present improved process we utilize as a hydrolytic agent for reacting upon the halogenated benzene in an aqueous mixture with water, certain weak basic compounds, i. e., salts of a strong base and weak acid. As examples of compounds of this character desirable for use in the connection in hand we may particularly name the carbonates, borates, phosphates and silicates of the alkali metals. Such basic salts in aqueous solution, while exercising some solvent action upon phenols, are not capable of neutralizing the latter to form phenates, so that the free phenol may be recovered from admixture with the solution by distillation, extraction or decantation without necessity for previous acidification. Hence in the reaction between a benzene halide and a basic salt solution of the above character, the phenol product is not dissolved as phenate in aqueous solution, but separates more or less therefrom as a distinct layer which can be decanted off, while the remainder of such phenol can be recovered by extraction or distillation from the aqueous layer. The chemical reactions involved, leading to the formation of phenol, are given by the following equations:—

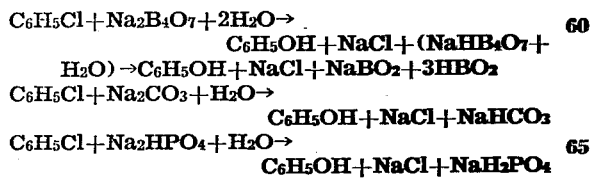

In the first equation the unstable sodium acid borate first formed breaks down further into the more stable metaborate and metaboric acid. The general reaction results in the conversion of the basic salt employed to the corresponding acid salt, from which the basic salt may be regenerated simply by treating with an equivalent of alkali metal hydroxide. The strength of the basic salt solution initially employed for the reaction may be varied considerably, but in general a solution of 10 to 20 per cent strength is satisfactory. The proportion of basic salt to be taken for the reaction is preferably somewhat in excess of one molecular equivalent of the mono-halogenated benzene, although this is not essential.

As a specific illustration of our improved process, the following example is given:—

Equi-molecular portions of chlorobenzene and borax (or preferably a slight excess of the latter) are brought together in water and the mixture heated in an autoclave to a temperature of 320° C. and above, e. g., up to 390° C. and at a pressure at or above the vapor tension of the reacting substances at the temperature in question. After approximately an hour or somewhat longer, the reaction mass is cooled while still under pressure, then withdrawn and the free phenolic layer separating is removed, such layer including any diphenyl oxide which has been incidentally formed. The phenol and diphenyl oxide are thereupon separated from each other and the diphenyl oxide is returned to the mixture that enters into the initial stage of the process where the latter is carried on continuously or to a succeeding batch if the process is carried on intermittently. Once the operation has been established such return of the diphenyl oxide is in effect continuously made, and the amount thereof in the reaction mixture is accordingly at all times maintained at the point where an approximate state of chemical balance exists with respect to the compound. The formation of more diphenyl oxide from the reacting ingredients is thus repressed to a marked extent; in other words the amount thereof will not be measurably increased as it thus passes and repasses through the system.

The critical factor in this consideration is the state of equilibrium between diphenyl oxide and water on the one hand and phenol on the other, expressed by the equation;—

$$(C_6H_5)_2O + H_2O \rightarrow 2C_6H_5OH$$

The rate of reaction of water upon diphenyl oxide becomes pronounced at 320°–325° C. in the presence of hydroxide-ion, hydrolyzing the latter to phenol, and equilibrium conditions are rapidly attained between 330° and 360°.

The residual aqueous solution, after the phenol and diphenyl oxide have been separated from the mixed products of the reaction, is treated with sufficient sodium hydroxide or equivalent base to reconvert the metaborate, as well as any free boric acid, into the form of ortho- or tetraborate and again brought into mixture with the same quantity of chlorobenzene as in the previous run plus the diphenyl oxide that is returned, as just explained above, and the process repeated.

Instead of separation of the reaction products by gravity as indicated in the foregoing description, the reaction product may be, of course, steamed out to remove the phenol. However, when sodium carbonate is used as the hydrolyzing agent with formation of sodium hydrogen carbonate in the product, it should be noted that the steam separation will cause the latter to lose some of its carbon dioxide and be converted again to the normal salt. Accordingly in this case in order to reproduce the same condition as before an additional quantity of sodium carbonate must needs be added with each additional quantity of chlorobenzene. It should be noted that at intervals an evaporation of the aqueous residue will be conducted for removal of the accumulated salt NaCl, followed by the re-dilution of the remaining liquid mass or mother liquor before further use.

While in the foregoing specific example, reference has been made specifically to the production of phenol, C₆H₅OH, it will be understood that the principle of the invention is generally applicable to the synthetic preparation of phenols by reaction of a halogenated aromatic hydrocarbon and a salt of a strong base and weak acid of the type herein described.

The reaction described above as occurring when a benzene halide is heated under pressure with water and a salt of a strong base and weak acid of the character described is measurably facilitated by the addition to the liquid mixture of a suitable catalytic agent, as for example, metallic copper. Whereas in the absence of such catalyst a temperature between about 320° and 390° or 400° C., preferably near the higher temperature, has been found necessary for the reaction, we have found that a temperature as low as 250° C. may be employed when the catalyst is present, and that at 300° C. the reaction proceeds rapidly under such condition. The catalyst may be provided as strips, cuttings, etc., of bright metallic copper commingled with the reaction mixture, or the reaction may be carried out in a copper, or copper-lined, autoclave. When loose copper strips or the like are employed in a steel reactor, provision should be made to prevent metallic contact between the copper and the steel, as described for instance in the patent application of J. J. Grebe, Serial No. 446,679, filed April 23, 1930 now Patent No. 1,814,796. Otherwise, the catalyst will become deactivated or "killed" by the action of metallic iron in contact therewith.

When the reaction is conducted in the presence of a metallic copper catalyst at a temperature of 300° C. or lower, the equilibrium between diphenyl oxide and phenol is very slowly established, so that the conversion of chlorobenzene is substantially complete before equilibrium is attained. Hence the amount of diphenyl oxide normally formed and recovered from the reaction product is less than corresponds to the true equilibrium. If only the amount thereof normally recovered were to be added initially to the reaction mixture, it would not completely, but only partially, repress the further formation of diphenyl oxide in the ensuing reaction. We have found that at 300° C. about 2 to 4 times the normal amount of diphenyl oxide produced must be added to the reaction mixture to prevent entirely the further formation thereof at the expense of the process materials. In a continuous process, however, wherein diphenyl oxide is continuously recovered from the product and reintroduced with the raw materials, two or more complete cycles will be required to build up a sufficient concentration of diphenyl oxide to establish the desired equilibrium with respect thereto at such lower temperature, but thereafter the equilibrium condition will be automatically maintained the same as when operating at the higher temperatures first mentioned.

The following example illustrates the results obtainable with the use of metallic copper as catalyst;—

1 mole chlorobenzene and 2 moles of a 10 per cent solution of sodium carbonate were introduced into a copper lined bomb and heated under pressure at 300° C. for 1½ hours. The product was removed and allowed to separate into an oil and an aqueous layer, the oil layer containing phenol, diphenyl oxide, a small amount of phenylphenol, and unreacted chlorobenzene. The layers were separated, the aqueous layer extracted with a solvent, e. g. benzene, and the extract added to the oil layer. The latter was then distilled for the separation of individual components. The conversion of chlorobenzene, i. e. the proportion thereof reacted, was 95 per cent and the yield of phenols corresponded to 97.3 per cent of the chlorobenzene reacted, while diphenyl oxide produced amounted to 3.56 per cent of the total phenol.

The foregoing reaction was repeated under the same conditions except that diphenyl oxide in 15 per cent excess of the amount produced in the first reaction was added initially to the reaction mixture. The conversion of chlorobenzene was 99.7 per cent, and diphenyl oxide formed in addition to that initially introduced was reduced to 2.7 per cent of the total phenol product, showing that the further formation thereof was partially repressed. Again repeating the reaction, but with addition of 3 times the amount of diphenyl oxide produced in the first instance, the conversion of chlorobenzene was substantially 100 per cent, and the further formation of diphenyl oxide was reduced to only 0.69 per cent of the phenol product.

Although a temperature in the neighborhood of 300° C. has been shown to be satisfactory for the reaction concerned when metallic copper is employed as catalyst, and may be specified preferably for commercial operation, obviously a higher temperature, e. g. as high as 390° or 400° C., may be employed, if so desired, without departing from the principle of the invention. At such higher temperatures a somewhat smaller proportional amount of diphenyl oxide, depending upon the actual temperature, will require to be added to the reaction mixture to prevent the further formation thereof, which would be an advantage for intermittent or batch operation. When conducting a continuous process, however, in which the diphenyl oxide is continuously separated from the product and reintroduced into the system, the equilibrium concentration thereof will be automatically established after one or more complete cycles regardless of the actual temperature maintained within the entire range disclosed.

In the case of working with sodium hydroxide in hydrolyzing chlorobenzene to phenol it is necessary in order to conserve sodium hydroxide to approach a 100 per cent conversion of chlorobenzene. However, in the case of hydrolyzing chlorobenzene to phenol using sodium carbonate or similar compounds, as in accordance with the present improved process, it is not necessary from an economic standpoint to get complete conversion of the chlorobenzene, because the chlorobenzene unreacted, and sodium carbonate converted to sodium hydrogen carbonate may be returned to the process as such and the chlorobenzene and the free phenol will be removable together. Accordingly, it should be noted that in practice the operation may be carried out using an excess of the benzene halide, since this may be removed from the reaction products along with the phenol and accompanying diphenyl oxide and thereupon be returned to the system with such diphenyl oxide.

This application is a continuation in part of our prior application Serial No. 221,852, filed September 24, 1927.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. A method of making free phenol directly without acidification of the reaction product, which comprises heating under pressure at a temperature between 320° and 400° C. a mixture of benzene monohalide and an aqueous solution of a salt of a strong base and a weak acid, and restraining the formation of diphenyl oxide by adding same to the reaction mixture.

2. A method of making free phenol directly without acidification of the reaction product, which comprises heating under pressure at a temperature between 320° and 400° C. a mixture of a benzene monohalide and an aqueous solution of a salt of a strong base and a weak acid, removing and separating phenol and diphenyl oxide from each other, and returning such diphenyl oxide to the first step.

3. A method of making free phenol directly without acidification of the reaction product, which comprises heating under pressure at a temperature between 320° and 400° C. a mixture of a benzene monohalide and an aqueous solution of a salt of a strong base and a weak acid, removing the phenol and accompanying diphenyl oxide together with any unreacted benzene halide, separating phenol from such mixture and returning the residue to the initial reaction.

4. In a method of making free phenol directly without acidification of the reaction product, the steps which consist in mixing chlorobenzene with an aqueous solution of salt of a strong base and a weak acid, causing the mixture to traverse a path wherein it is subject to a temperature from 320° to 400° C. and a corresponding pressure, removing the phenol and accompanying diphenyl oxide together with any unreacted chlorobenzene, separating phenol from such mixture and returning the residue to the reaction mixture.

5. A method of making free phenol directly without acidification of the reaction product which comprises heating under pressure a mixture of chlorobenzene and an aqueous sodium carbonate solution at a temperature between 320° and 400° C. and restraining the formation of diphenyl oxide by adding same to the reaction mixture.

6. A method of making a free phenol directly without acidification of the reaction product which comprises heating a monohalogenated benzene under pressure with an aqueous solution of a salt of a strong base and weak acid in the presence of metallic copper as catalyst, and restraining the formation of diphenyl oxide by initially adding the same to the reaction mixture.

7. A method of making a free phenol directly without acidification of the reaction product which comprises heating a monohalogenated benzene under pressure with an aqueous solution of a sale of a strong base and weak acid in the presence of metallic copper as catalyst, removing phenol and accompanying diphenyl oxide from the reaction product, separating diphenyl oxide and returning the same to the initial reaction.

8. A method of making a free phenol directly without acidification of the reaction product which comprises heating a monohalogenated benzene under pressure with an aqueous solution of a salt of a strong base and weak acid in the presence of metallic copper at catalyst, removing phenol and accompanying diphenyl oxide, together with unreacted halogenated benzene from the reaction product, separating phenol from such mixture and returning the residue of diphenyl oxide and halogenated benzene to the initial reaction.

9. A method of making free phenol directly without acidification of the reaction product which comprises heating chlorobenzene under pressure with an aqueous sodium carbonate solution in the presence of metallic copper as catalyst and restraining the formation of diphenyl oxide by initially adding the same to the reaction mixture.

10. A method of making free phenol directly without acidification of the reaction product which comprises heating under pressure a mixture of chlorobenzene and an aqueous sodium carbonate solution at a temperature between 250° and 400° C. in the presence of metallic copper as catalyst, removing phenol and accompanying diphenyl oxide from the reaction product, separating diphenyl oxide and returning the same to the initial reaction.

11. A method of making free phenol directly without acidification of the reaction product which comprises heating under pressure a mixture of chlorobenzene and an aqueous sodium carbonate solution at a temperature between 250° and 400° C. in the presence of metallic copper as catalyst, removing phenol and accompanying diphenyl oxide together with unreacted chlorobenzene from the reaction product, separating phenol from such mixture and returning the residue of diphenyl oxide and chlorobenzene to the initial reaction.

WILLIAM J. HALE.
EDGAR C. BRITTON.